United States Patent [19]

MacTavish

[11] Patent Number: 5,297,672

[45] Date of Patent: Mar. 29, 1994

[54] SECURITY PACKAGE FOR COMPACT DISCS

[76] Inventor: William D. MacTavish, 1201 Shallow Creek Cir., Hopkinsville, Ky. 42240

[21] Appl. No.: 9,688

[22] Filed: Jan. 27, 1993

[51] Int. Cl.[5] .................... B65D 85/57; B65D 85/672
[52] U.S. Cl. .................................. 206/1.5; 206/807; 206/309; 206/387
[58] Field of Search ................ 206/1.5, 807, 309, 387

[56] References Cited

U.S. PATENT DOCUMENTS

| | | | |
|---|---|---|---|
| 3,650,382 | 3/1972 | Braun et al. | 206/45.14 |
| 3,871,516 | 3/1975 | Holkestad et al. | 206/45 |
| 4,366,915 | 1/1983 | Seidler | 220/339 |
| 4,381,836 | 5/1983 | Rivkin et al. | 206/387 |
| 4,567,983 | 2/1986 | Morris | 206/387 |
| 4,572,369 | 2/1986 | Morris | 206/387 |
| 4,589,549 | 5/1986 | Hehn | 206/387 |
| 4,634,004 | 1/1987 | Mortensen | 206/387 |
| 4,718,547 | 1/1988 | MacTavish | 206/309 |
| 4,759,442 | 7/1988 | Gregerson et al. | 206/807 X |
| 4,802,601 | 2/1989 | Pijanowski et al. | 220/4 |
| 4,805,769 | 2/1989 | Soltis et al. | 206/309 |
| 4,834,238 | 5/1989 | Hehn et al. | 206/387 |
| 4,865,190 | 9/1989 | Gregerson et al. | 206/309 |
| 4,871,065 | 10/1989 | Hehn et al. | 206/807 X |
| 5,205,401 | 4/1993 | Weisburn et al. | 206/807 X |
| 5,211,283 | 5/1993 | Weisburn et al. | 206/1.5 |
| 5,215,188 | 6/1993 | Wittman | 206/807 X |
| 5,215,189 | 6/1993 | Weisburn et al. | 206/1.5 |

*Primary Examiner*—William I. Price
*Attorney, Agent, or Firm*—Mark J. Patterson; Edward D. Lanquist, Jr.; I. C. Waddey, Jr.

[57] ABSTRACT

The present invention discloses a security package for a compact disc having a receiving structure and a retaining plate. The receiving structure has a handle, a lock section, and a storage compartment. The storage compartment receives the audio media. The audio media is held in place by the retainer plate which is pivotally attached to the lock section of the receiving structure. The retainer plate has a flange which covers a portion of the storage compartment holding the media in place. The receiving structure can enclose a detection strip which is then covered by the retainer plate.

6 Claims, 6 Drawing Sheets

5,297,672

SECURITY PACKAGE FOR COMPACT DISCS

BACKGROUND OF THE INVENTION

The present invention relates generally to packaging devices for audio and vido media and more particularly to a security package for storing compact discs, cassette tape, video tapes, and the like, sold in retail stores.

It will be appreciated by those skilled in the art that pre-recorded audio/video products, such as compact discs and casette tapes, are packaged in small containers by the manufacturers, making shoftlifting relatively easy. As a result, retailers prefer to futher package these products in security packages which are much larger and therefore much more difficult to conceal by a would-be shoplifter. Some manufacturers have attempted to address this problem themselves by incorporating the plastic CD "jewel box"or cassette container into a much larger carboard box which is removed and discarded by the consumer after purchase. However, such packaging is wasteful and considered to be environmentally unsound. Equally wasteful are prior art plastic security packages that must be destroyed in order to be removed.

Further, it will be appreciated by those skilled in the art that retail security packaging frequently includes a detectable strip which is removed after purchase but when unpurchased will activate an electronic theft detection device. The detection strip are so commonly used that people are now beginning to realize that they exist and at times remove them in order to steal the package.

It will further be appreciated by those skilled in the art that in order to be cost effective, the security packages must be reusable. As a result, there have been several attempts to develop an improved security package for retail auto/video products.

U.S. Pat. No. 4,589,549 issued to B. Hehn on May 20, 1986, discloses an audio cassette package which is reusable. Unfortunately, the usefulness of the Hehn device is limited in that the lock section cannot be removed from the receiving section. The lock section slides with respect to the stored section. Further, this package provides an exposed detection strip as opposed to one which is not easily removed.

U.S. Pat. No. 4,865,190 issued to B. Gregerson on Sept. 12, 1989, discloses a security package with a rotatable locking channel. Unfortunately, this device has a live hinge means which can wear out over time. Further, the device is not reusable because after one use, the latch becomes deformed.

U.S. Pat. No. 3,650,382 issued to S. Braun et al on Mar. 21, 1972, discloses a molded plastic display package. Braun et al also uses a live hinge and is not reusable.

U.S. Pat. No. 4,834,238 issued to B. Hehn et al on May 30, 1989, discloses a cassette security package. Like the other devices, this package has a live hinge and is not reusable.

U.S. Pat. No. 4,718,547 issued to Applicant on Jan. 12, 1988, discloses a compact disc security device. It too has a live hinge and is not reusable.

U.S. Pat. No 3,871,516 issued to H. Holkestad on Mar. 18, 1975, discloses an anti-theft packaging device which is not reusable.

U.S. Pat. No.4,366,915 issued to D. Seidler on Jan. 1983, discloses a hinged lid container which is not reusable.

U.S. Pat. No. 4,381,836 issued to Rivkin et al on May 3, 1983, discloses an anti-theft point-of-sale container which is not reusable.

U.S. Pat. No. 4,567,983 issued to W. Morris on Feb. 4, 1986, discloses a theft resistant cassette holder which is not reusable.

U.S. Pat. No. 4,572,369 issued to W. Morris on Feb. 25, 1986, discloses a theft resistant cassette holder which is not reusable.

U.S. Pat. No. 4,634,334 issued to R. Mortensen on Jan. 6, 1987, discloses a magnetic tape security housing which is not reusable.

U.S. Pat. No. 4,802,601 issued to Pijanowski et al on Feb. 7, 1989, discloses a housing which is not reusable.

U.S. Pat. No. 4,805,769 issued to Soltis et al on Feb. 21, 1989, discloses a compact disc security holder which is not reusable.

What is needed, then, is a reusable security package for audio/video products which is easy to manufacture and easy to assemble. This needed security package must be easily locked and unlocked by store personnel. This security package must be capable of receiving a detection strip such that it is disposed and out of reach of potential thieves. This needed device should be usable with unlocking keys used in connection with other commonly found security packages. This device is presently lacking in the prior art.

SUMMARY OF THE INVENTION

The present invention discloses a security package for a compact disc having a receiving structure and a lockable retainer plate. The receiving structure includes a handle, a lock section, and a storage compartment. The storage compartment encloses the audio media. The audio media is held in place by the reatginer plate which is pivotally hinged to the receiving structure. The retainer plate has a flange which covers a portion of the storage compartment, thereby holding the media in place. The receiving structure can also enclose a detection strip which is then covered by the retainer plate.

Accordingly, one object of the present invention is to provide a reusable security package.

Still another object of the present invention is to provide a security package which can enclose a security detection strip.

Still another object of the present invention is to provide a security package which can be unlocked using an industry standard package key.

DETAILED DESCRIPTION OF THE PREFERRED EMBODIMENT

Figure 1:
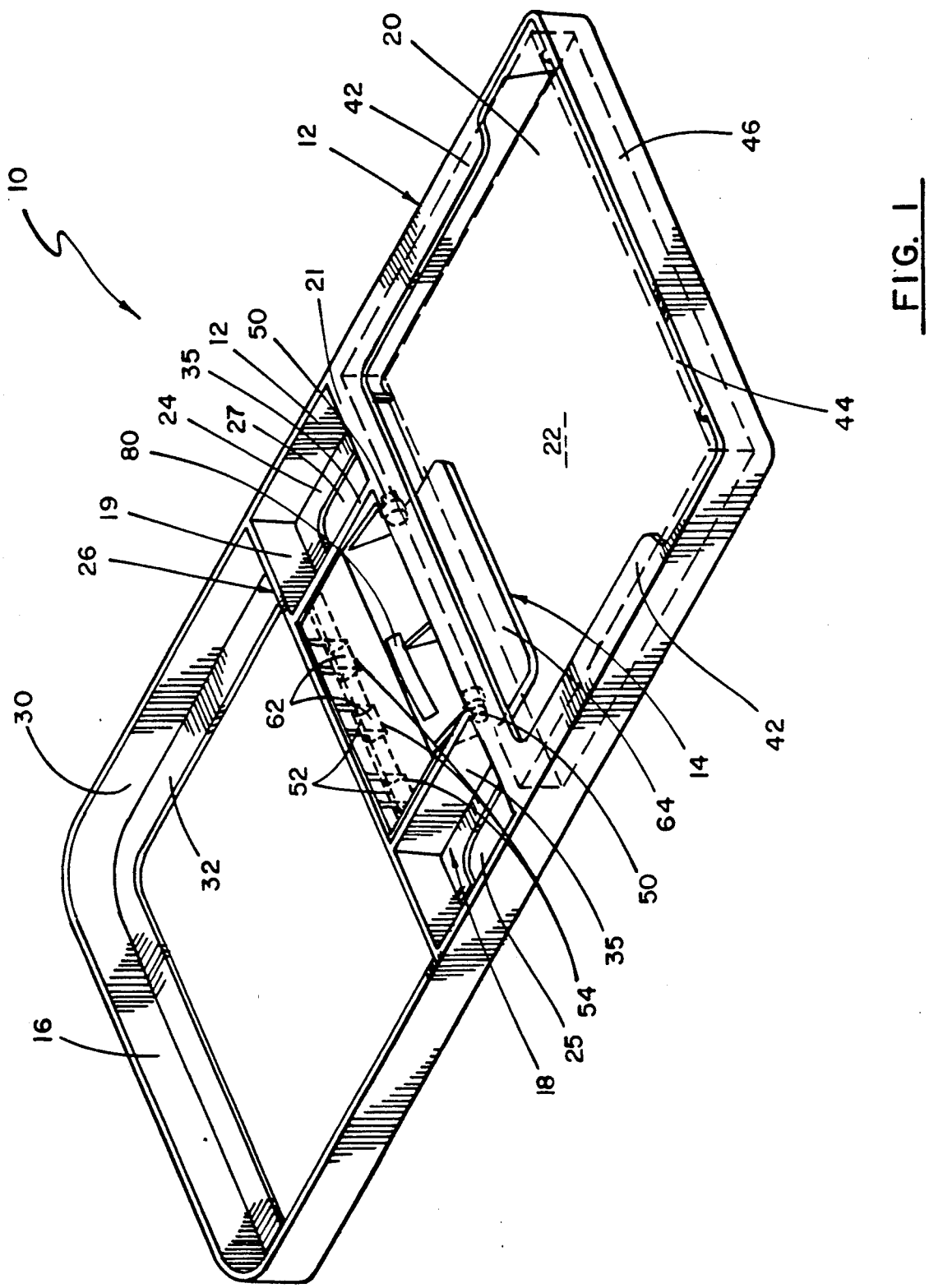
FIG. 1 is a perspective view of the security package of the present invention looking from the rear of the package.

Referring now to FIG. 1 there is shown generally at 10 the compact disc security package of the present invention. Package 10 includes a rectangular compact disc ("CD") receiving structure 12 which is joined to a hinged retainer plate 14. Receiving structure 12 includes a handle 16, lock section 18, and storage compartment 20. Storage compartment 20 houses media 22, in this embodiment a CD. In the preferred embodiment, receiving structure 12 is molded to create a unitary piece but separate from retainer plate 14. As a result, handle 16, lock section 18, and storage compartment 20 are integral to receiving structure 12.

Handle 16 is formed of a rectangular vertical wall 30 supporting an adjacent upper horizontal flange 32.

Storage compartment 20 is formed by a continuation of wall 30 along both sides and the bottom edge of compartment 20, lower retaining flange 42 which extends partially down each side of compartment 20, and upper retaining flange 46 which extends across the bottom edge of receiving structure. This defines an opening 44 which substantially conforms to the shape of an industry standard size CD jewel box. CD 22 is placed into storage compartment 20 through opening 44 under upper flange 46 and resisting against lower flange 42. Upper and lower retaining flanges 46 and 42 prevent removal of CD 22 from receiving structure 12 except by sliding it upward toward handle 16 and tilting it away from lower flange 42.

Disposed between handle 16 and storage compartment 22 is integral lock section 18, the perimeter of which is formed by top wall 19, bottom waall 21, each of which extend transversely between left and right side sections of vertical walal 30, and connecting of right and left vertical walls 30. A planar surface 24 extends across and partially covers lock section 18, with finger holes 25 and 27 on either side of locking chamber 26. Locking chamber 26, which is further defined by left and right vertical walls 35, is also partially covered by surface 24 but leaving a rectangular opening 28 (FIG. 4) to allow for movement of retainer plate 14, and three rectangular keyholes 54.

Extending horizontally from each wall 35 within locking chamber 26 is a hinge pin 50. Molded integral to that portion of top wall 19 which is within locking chamber 26 are three female latch ports 52

Retainer plate 14(FIG. 3) is formed of lower planar surface 61 joining left and right side walls 63, a top vertical wall 65, an angled bottom vertical wall 67, and a flange 64 extending horizontally from the upper edges of angled wall 67 and side wall 63. The dimensions of the rectangular space defined by top wall 65, angled wall 67, and connecting sections of side walls 63 are slightly less thana the dimensions of locking chamber 26 of receiving structure 12. Molded into each lower edge of side walls 63 are integral hinges 60 which pivotally engage hinge pins 50.

Integral to top wall 65 of retainer plate 14 are male latches 62 which are releasably received by female latch ports 52 of receiving structure 12. When retainer plate 14 is rotated to the closed position, flange 64 extends over storage compartment 20 to hold CD 22 in place and prevent its removal except by release of latches 62. Latches 62 extend outwardly from lower wall 65, supported by wall bias section 66.

As shown in FIG. 1, a adetectable security strip 80, well known by those in the art, can be placed within locking chamber 26 so that when retainer plate 14 is rotated to the locked position, the consumer cannot remove it.

Figure 2:
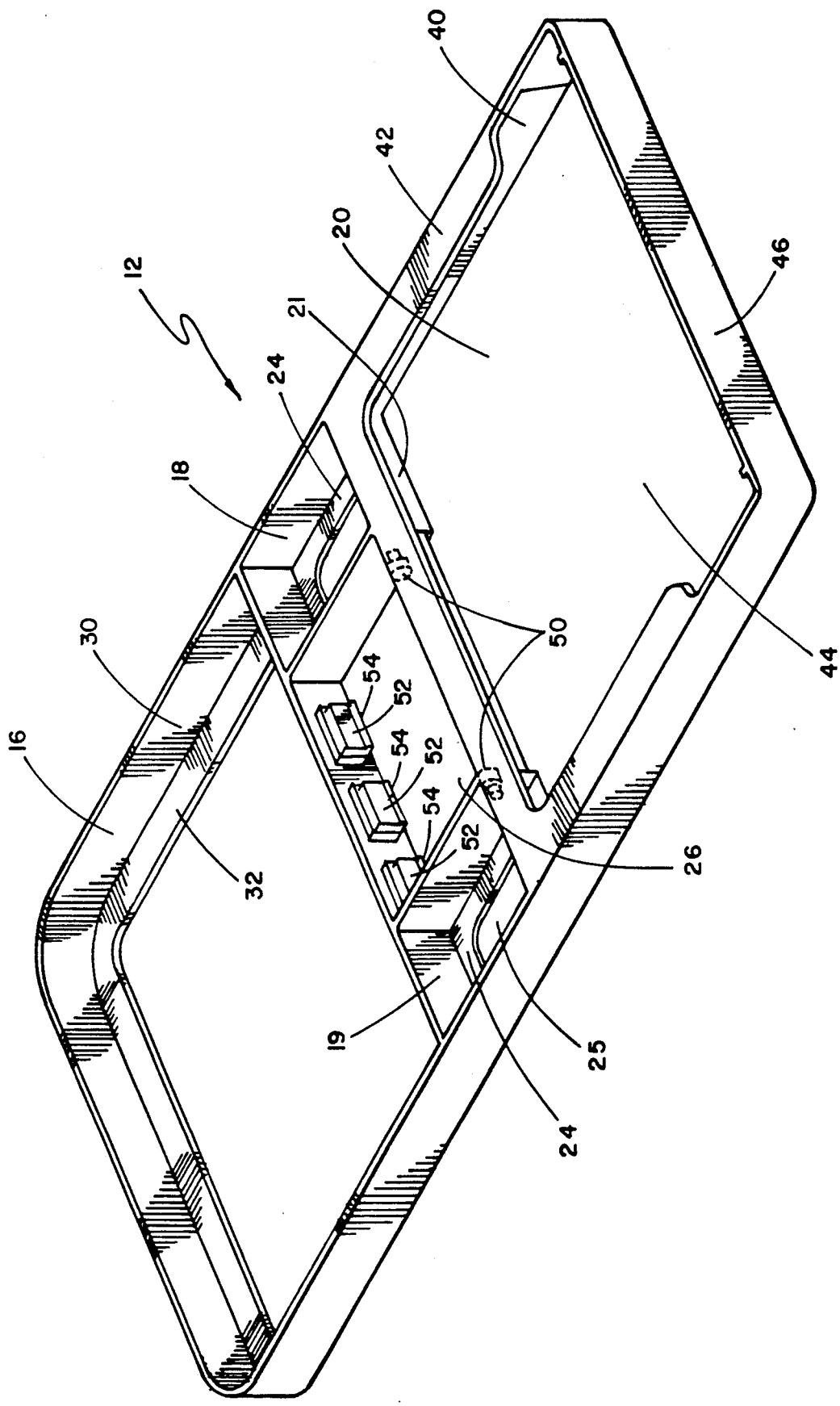
FIG. 2 is a perspective view of the receiving structure of the present invention.

Referring now to FIG. 2 there is shown generally at 12 the receiving structure of the present invention. FIG. 2 shows, in greater detail, keyholes 54 and female latch ports 52 as well as lower retaining flange 42 and upper retaining flange 46.

Figure 3:
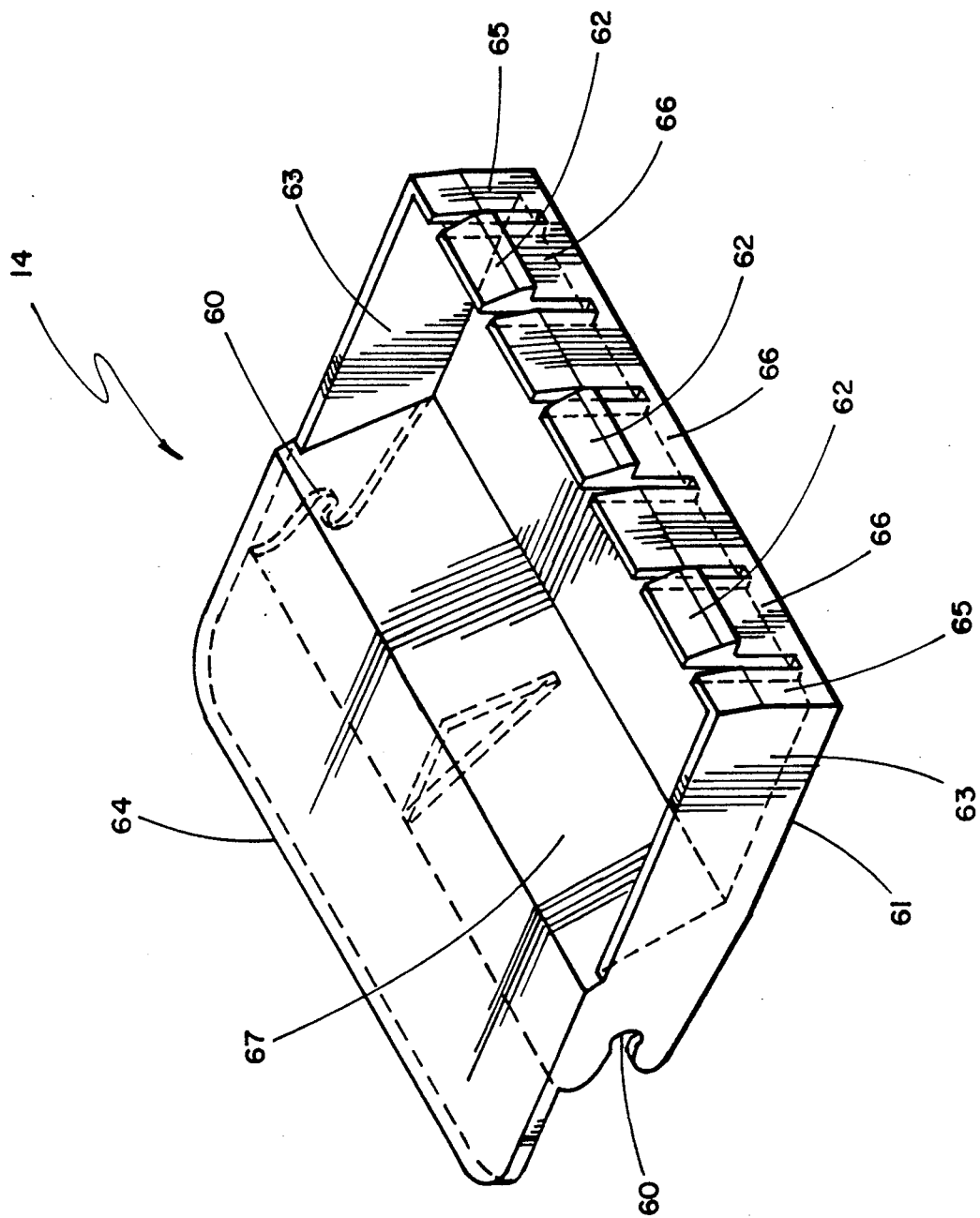
FIG. 3 is a perspective view of the retainer plate of the present invention.

Referring now to FIG. 3 there is shown generally at 14 the retainer plate of the present invention. FIG. 3 shows, in greater detail, latches 62 which are attached to retainer plate 14 by wall bias sections 66. Bias sections 66 allow flexing of latches 62 such that they can slide down upper vertical wall 19 of locking section 18 and positively engage latch ports 52. Further, FIG. 3 shows, in greater detail, flange 64 and hinges 60.

Figure 4:
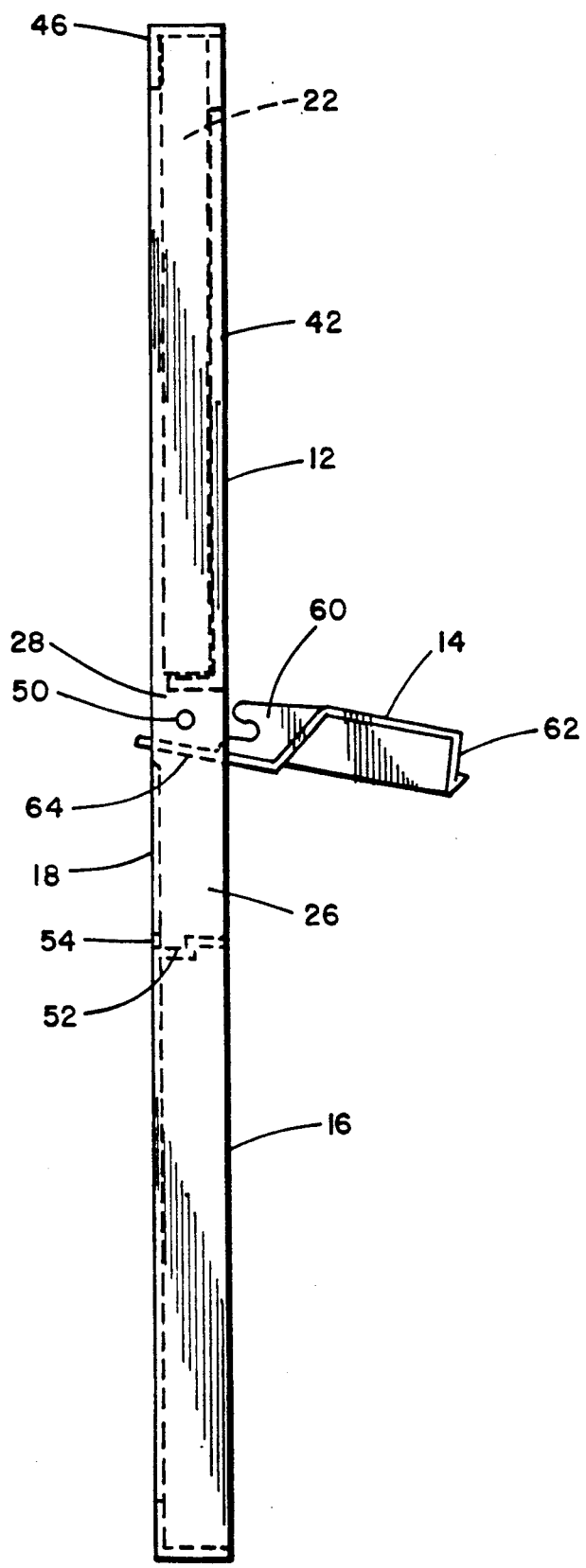
FIG. 4 is a side view of the unassembled security package showing the retainer plate about to be engaged by the hinge pins of the receiving structure.
Figure 5:
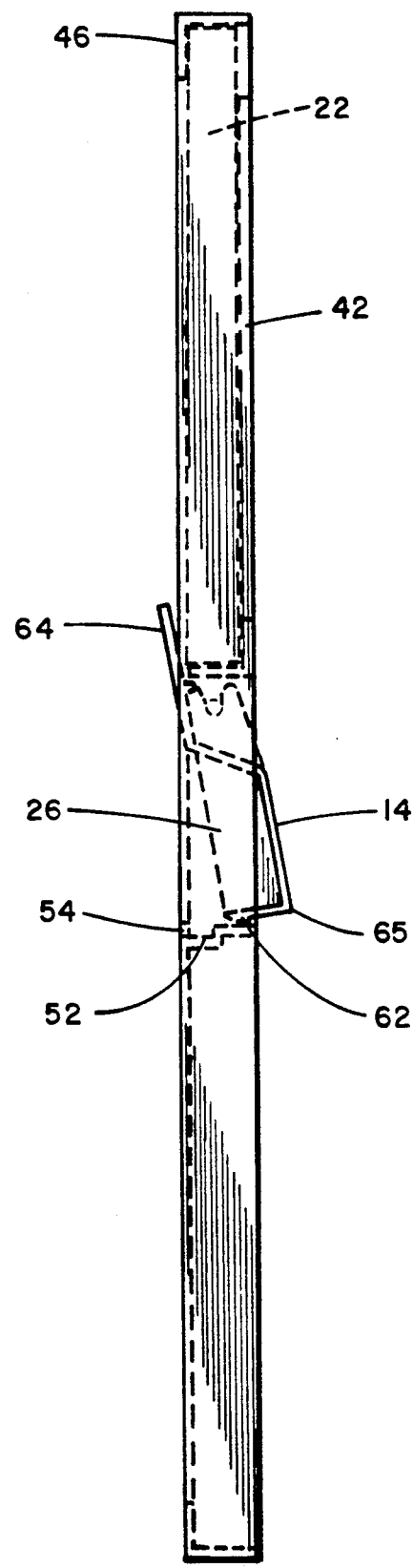
FIG. 5 is a side view of the assembled security package with the hinged retainer plate which is about to be placed in the locked position in the receiving structure.
Figure 6:
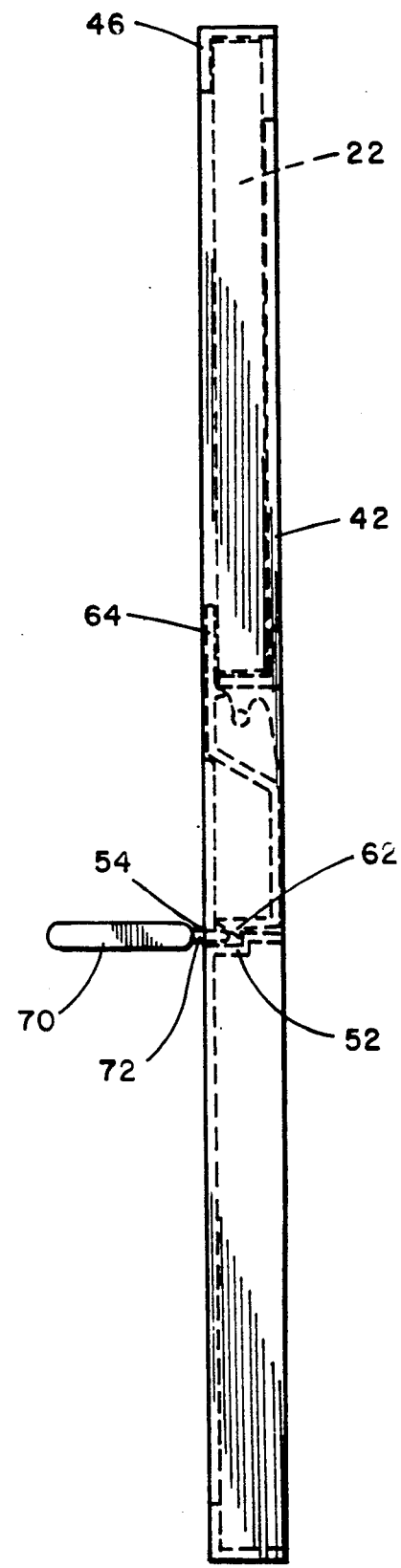
FIG. 6 is a side view of the locked security package being opened by a key.

Referring now to FIGS. 4-6 there is shown generally at 10 the operation of the security package of the present invention. The retailer will initially pivot retainer plate 14 upward and slide CD 22 under upper retaining flange 46 and against lower retaining flange 42 in storage compartment 20. Retainer plate 14 is then directed toward receiving structure 12 and pivoted in place such that flange 64 extends into storage compartment 20 to cover CD 22. As can be seen in more detail in FIG. 5, latches 62 are flexed rearward from wall 65 as they approach latch ports 52. When latches 62 are aligned with latch ports 52, they move forward and outward from wall 65 to form a locking engagement. After retainer plate 14 is locked in place, CD 22 cannot be removed except by causing the disengagement of latches 62 from latch ports 52. However, because latches 62 and ports 52 are now concealed within locking chamber 26, access to latches 62 can be made only through keyholes 51. A key 70 having teeth 72 is inserted into keyholes 54 to bias latches 62 away from latch ports 52 thereby allowing retainer plate 14 to swing open. CD 22 can then be removed for retail purchase and package 10 reused.

In the preferred embodiment, retaianer plate 14 and receiving structure are molded from polystyrene plastic. However, any type of plastic resin can be used.

Thus, although there have been described particular embodiments of the present invention of a new and useful security package for compact discs, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A reusable security package for audio media comprising:
   a. a media receiving structure having a handle, a lock section, and a storage compartment;
   b. a retainer plate pivotally attached to said lock section and movable to locked and unlocked positions;
   c. said storage compartment shaped to receive and contain said media;
   d. said lock section having at least one latch port and a keyhole aligned with said latch port to receive a key;

e. said retainer plate having at least one latch receivable by said latch port when said retainer plate is in said locked position, and said retainer plate including a flange for holding said media in said storage compartment when said retainer plate is in said locked position; and f. said latch releasable from said latch port only by insertion of said key through said keyhole.

2. The security package of claim 1 wherein said lock section further comprises a locking chamber and when said retainer plate is in said locked position, said locking chamber is accessible only through said keyhole.

3. The security package of claim 2, said retainer plate further comprising integral hinge means for pivotally attaching said retainer plate to said lock section.

4. The security package of claim 3 wherein said locking chamber comprises top, bottom, left, and right walls and said latch ports are molded integral to said top wall.

5. The security package of claim 4, said retainer plate further comprising a planar surface joining a top wall, a bottom wall, and left and right side walls, said walls defining a rectangular space having dimensions slightly less than said locking chamber such that said rectangular space can rest inside said locking chamber when said retainer plate is in said locked position.

6. A security package for audio and video products comprising:

a. a unitary structure for receiving said product, said structure having a handle disposed above a lock section and a storage compartment disposed below said lock section, said handle, said lock section, and said storage compartment integral to said receiving structure;

b. a unitary plate for retaining said product in said storage compartment, said plate hinged to said receiving structure and pivotable to a locked and to an unlocked position;

c. said plate including an integral flange which, when said plate is in said locked position, extends horizontally above said product and said storage compartment when said retainer plate is in said locked position;

d. said retainer plate further comprising means for latching said plate to said lock section when said plate is in said locked position; and e. said lock section comprising holes allowing access by a key through said holes to said latching means for unlocking said retainer plate.

* * * * *